Inventor
William A. Harris
By 
Attorney

Sept. 16, 1941.   W. A. HARRIS   2,256,282
DISPENSING APPARATUS
Filed Sept. 9, 1938   7 Sheets-Sheet 3

Sept. 16, 1941.   W. A. HARRIS   2,256,282
DISPENSING APPARATUS
Filed Sept. 9, 1938   7 Sheets-Sheet 4

Inventor
William A. Harris
By Munn, Anderson & Liddy
Attorney

Patented Sept. 16, 1941

2,256,282

UNITED STATES PATENT OFFICE 2,256,282

DISPENSING APPARATUS

William A. Harris, Greenville, S. C., assignor, by direct and mesne assignments, to The South Carolina National Bank of Charleston, Greenville, S. C., as trustee Application September 9, 1938, Serial No. 229,183

10 Claims. (Cl. 312—48)

This invention relates to dispensing apparatus.

An object of the invention is the provision of a machine for dispensing a single article or a plurality of articles in succession.

A further object of the invention is the provision of a machine for dispensing articles successively and the number of articles which are successively dispensed depending upon the amount of money deposited in the machine.

Another object of the invention is the provision of a machine for dispensing any number of single articles upon taking the proper steps for setting the machine in operation, means being provided for stopping the machine and locking it against further operation after the manipulator has obtained the number of articles to which he is entitled.

A further object of the invention is the provision of a machine for dispensing cigarettes or cigars, one by one, the number obtained depending upon the operator taking the proper steps, a plurality of cartons for the cigarettes or cigars of various brands having labels or revenue stamps exposed to view, provision being made to mutilate the revenue stamps applied to the packages of the cigarettes or cigars while at the same time providing a sight window to expose to view a plurality of the cigarettes or cigars.

A still further object of the invention is the provision of a machine for dispensing articles singly and successively in which means is provided to prevent operation of those sections of the machine in which the cartons or chambers containing the articles have been removed.

Another object of the invention is the provision of a machine for dispensing articles one by one and successively with means for preventing full or partial actuation of the dispensing apparatus before the machine has been set in operation by a coin of proper denomination.

Another object of the invention is the provision of a machine for dispensing articles one by one by the insertion of a proper coin, the articles being enclosed within containers forming the magazine, said magazine having means for engagement with an element of the machine which when so engaged will set said elements of the machine in position for dispensing articles from the container when the machine is properly operated.

Another object of the invention is the provision of a machine for dispensing articles one by one in which a plurality of magazines are placed in juxtaposition from which the articles are dispensed with means for preventing the discharge of more than one article from the various magazines when two or more levers which actuate the dispensing means are attempted to be actuated simultaneously.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

Figures 1, 11:
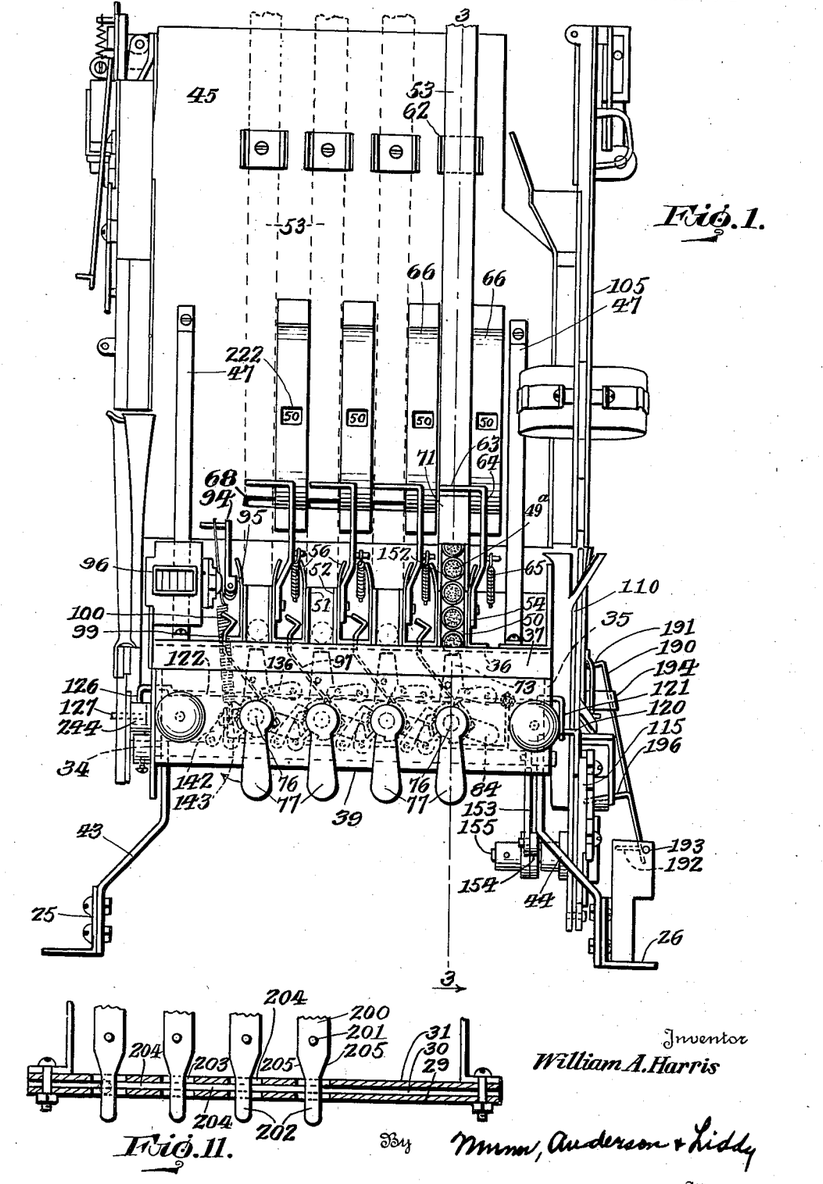
Figure 1 is a front view in elevation of my dispensing apparatus with the cover removed.
Figure 11 is a vertical section taken along the line 11—11 of Figure 10.
Figures 2, 10, 12:
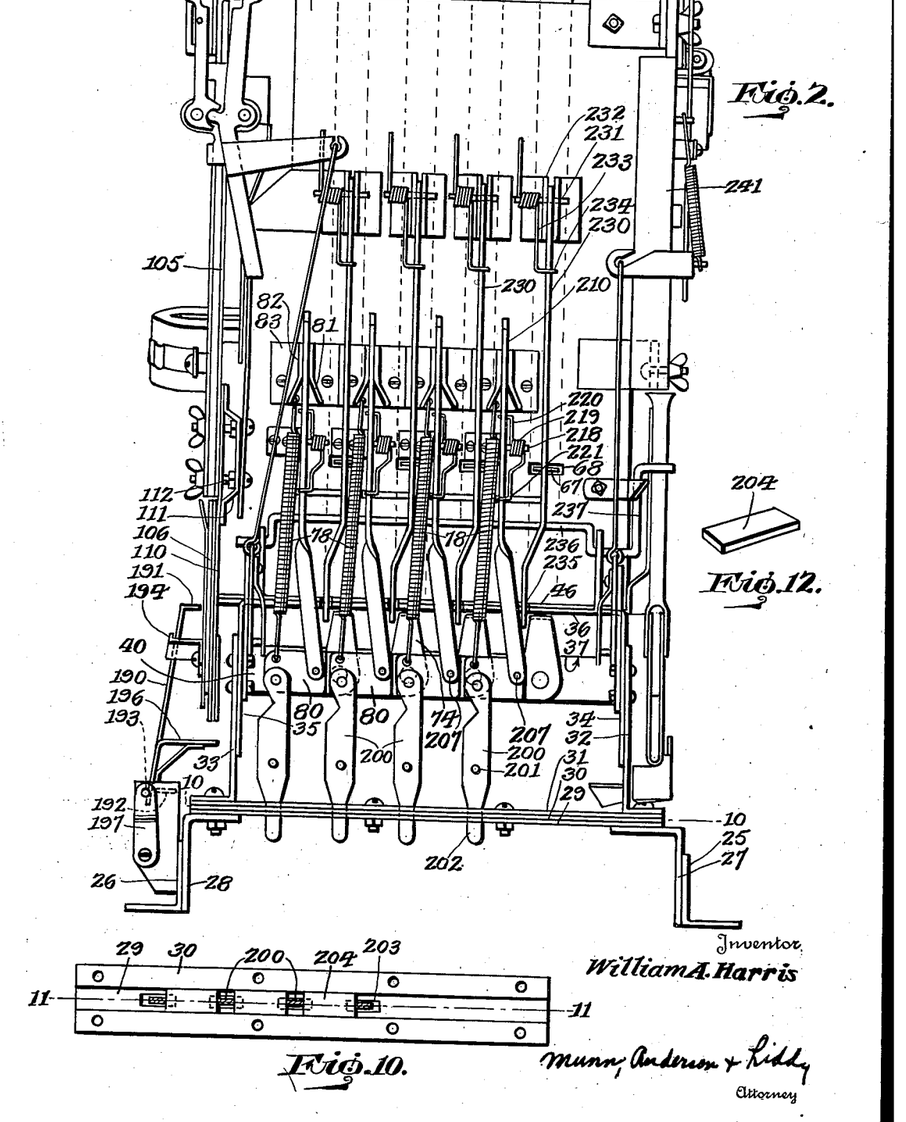
Figure 2 is a rear view of the dispensing apparatus per se.
Figure 10 is a horizontal section taken along the line 10—10 of Figure 2.
Figure 12 is a view in perspective of a locking plate shown in Figures 10 and 11.

Referring more particularly to the drawings (Fig. 2) 25 and 26 designate L-shaped base members to which are connected respectively the right angle brackets 27 and 28, at the rear of the machine. To the tops of the brackets 27 and 28 are secured two plates 29 and 31 between which are located a pair of spacing strips 30 (Figs. 10 and 11). A pair of upstanding brackets 32 and 33 are secured to the opposite ends of said plates. A pair of side plates 34 and 35 are respectively secured to the brackets 32 and 33. These side plates depend from the opposite ends of a table 36 which is horizontally disposed and has a depending apron 37 which is spaced inwardly from the front end of the machine as shown in Figures 1 and 2.

Figure 4:
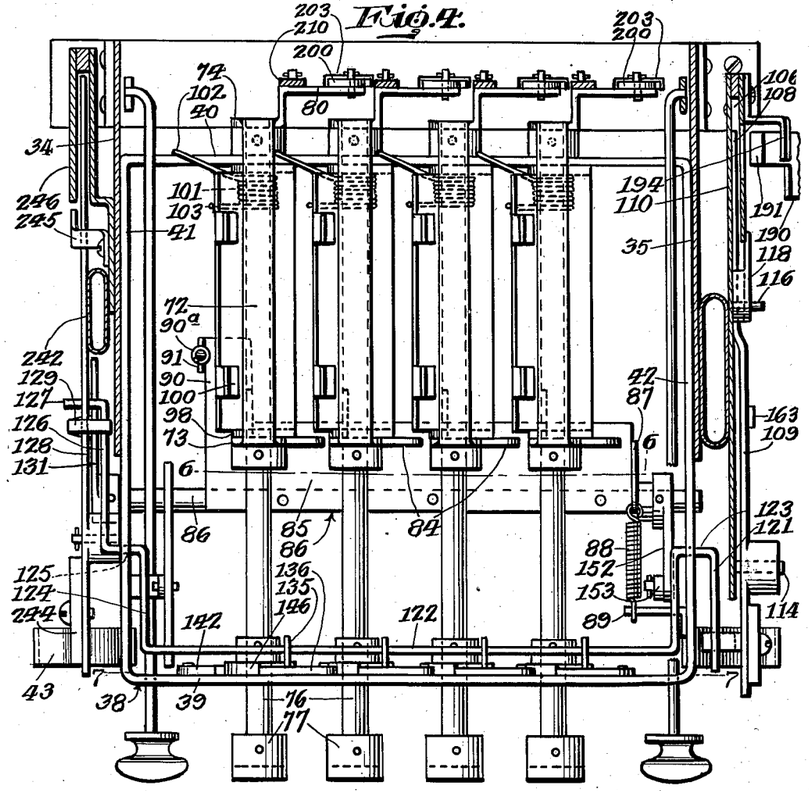
Figure 4 is a horizontal section taken along the lines 4—4 of Figure 3.

A rectangularly shaped member 38, shown more particularly in Figure 4, is composed of a front bar 39, a rear bar 40 and side bars 41 and 42 which are secured to the side plates 34 and 35. This rectangularly shaped member is supported at its front end by means of legs 43 and 44 which are secured to the base members 25 and 26. The member 38 provides means for supporting certain shafts to be presently explained.

A back plate 45 has a flange 46 at its lower end which is secured to the rear end of the table 36. The front of the plate is braced by bars 47 (Fig. 1) which are secured at their upper ends to the back plate 45, while the lower ends are secured to the table.

The table 36 is provided with a plurality of openings 48 (Fig. 6) through which the articles are adapted to be dispensed. The articles in this case are shown at 49a as cigarettes, although it will be appreciated that any kind of dispensable article may be sold by this machine. The openings 48 extend transversely of the table and are of sufficient length and width to permit the article to be freely discharged through said openings. A plurality of smaller openings 49 are located adjacently to the transverse openings 48 for a purpose which will be presently explained.

A plurality of upstanding plates 50 and 51 are located along the edges of the openings 48 and are adapted to guide the cigarettes downwardly from the open end 52 of a carton 53 (Fig. 1). It will be noted that the lower end of each carton rests upon the upper edges of the plates 50 and 51 and is supported thereby. To the plates 50 and 51 are respectively secured thinner plates 54 and 55. The upper ends of the last mentioned plates are flared outwardly as shown at 56 to permit the ready insertion of the lower end of the carton onto the upper edges of the plates 51 and 52. The plate 55 is provided with an opening 57 which is alined with an opening 58 in the plate 52 for a purpose which will be presently explained. The plates 54 and 55 are respectively provided with angular portions 59 and 60 which are secured to the table 36 and since the plates 54 and 55 are secured respectively to the plates 50 and 51, the last mentioned plates are supported in spaced vertical position on said table. The angular portions 60 are formed with openings 61 which aline with the openings 49 in the table 36.

A plurality of U-shaped clips 62 are secured to the back plate 45 in spaced relation and are adapted to receive the rear portion adjacent the upper end of the cartons 53 for aiding in maintaining the cartons in position.

At the front end of each carton is located a finger 63 carried by a pivoted arm 64 and the finger 63 is forced against the front of the carton by means of the spring 65 which exerts a pull on the arm 64 at all times. The spring is so positioned with respect to the arm 64 that when the arm is swung downwardly and away from the carton and when it is desired to remove the carton the spring will maintain the arm in its lowered position.

The cartons are further aided in being maintained in their vertical position by pairs of spaced casings 66 which contain counters for indicating the number of cigarettes or articles remaining in each magazine or container 53. The mechanism for counting the cigarettes as they are dispensed from each container or magazine will be presently explained.

Figures 3, 13, 14, 15:
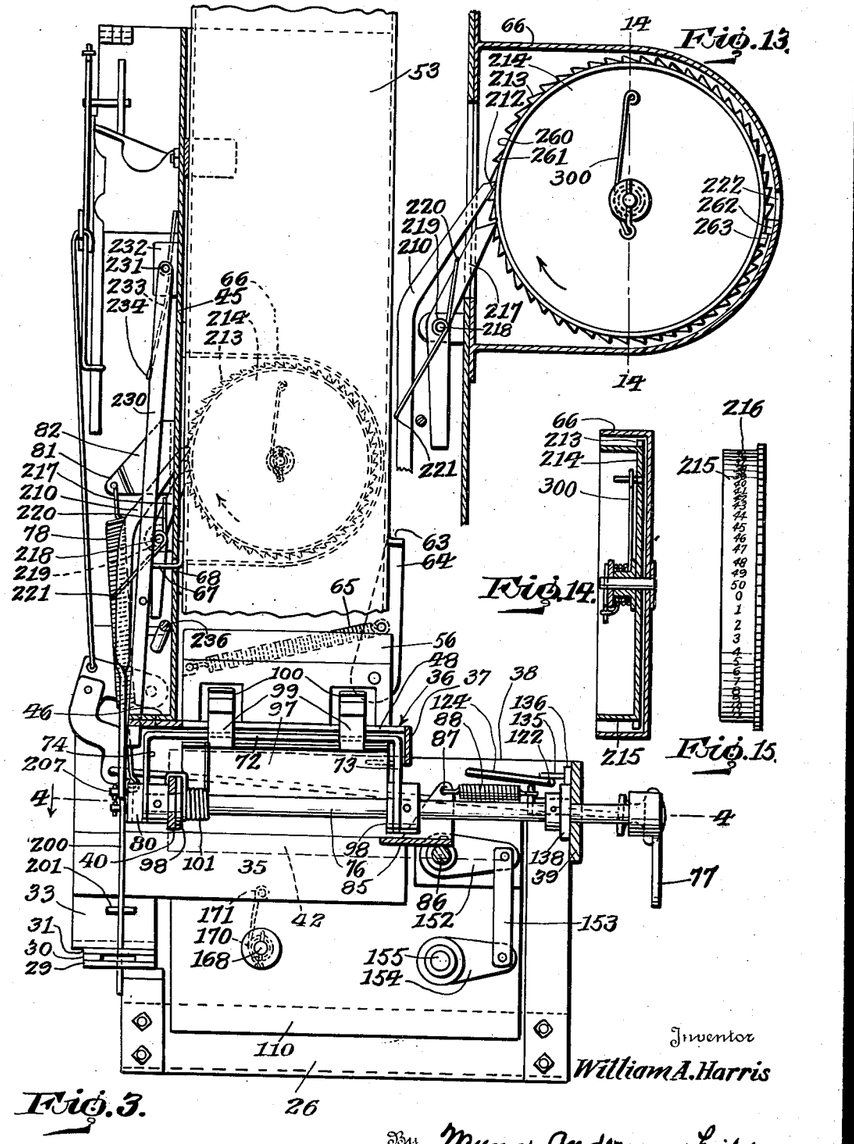
Figure 3 is a transverse vertical section taken along the line 3—3 of Figure 1.
Figure 13 is a fragmentary enlarged vertical section of the counter of the device for counting the number of articles dispensed.
Figure 14 is a vertical section taken along the line 14—14 of Figure 13.
Figure 15 is a view in elevation of the counter.

Each carton 53 at its rear end is provided with a metal lip 67 which is normally bent flat against the rear wall when being shipped, but which is bent out at right angles as shown in Fig. 3 when placed in the dispensing apparatus and the lip will pass through an opening 68 in the back wall 45 for a purpose which will be presently explained. The front wall of the carton is provided with the usual labels for indicating the brand of the cigarettes or cigars or other articles which are dispensed, and these labels together with their indicia will appear through the transparent window 69 formed at the front of the outer casing 70. The stamp shown at 71 and which is mutilated by the removal of a portion of the lower front end wall of the carton or magazine also appears through the window 69. Thus, it will be seen that at least five or six of the articles can be seen through the window 69 below and at the bottom of the magazine at all times. The containers for certain types of merchandise such as cigarettes or cigars where stamps are required to be placed upon the carton when they are sold and where the stamp must be mutilated when the carton is opened will have the lower front ends of the carton provided with a removable perforated portion not only for showing the articles in the carton, but for causing mutilation of the stamp. The carton employed in this machine is described and claimed in a separate application filed September 9, 1938, Serial No. 229,186.

Figure 7:
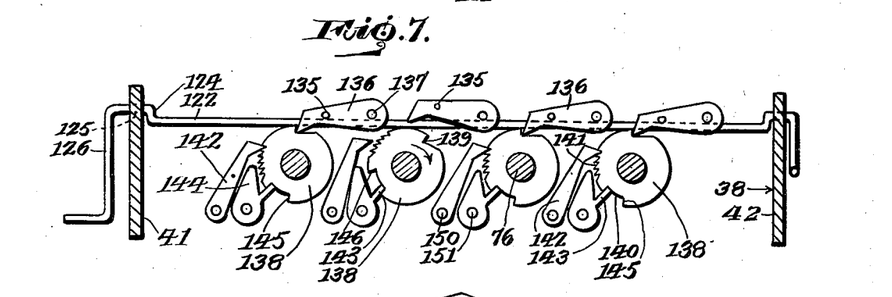
Figure 7 is a vertical section taken along the line 7—7 of Figure 4.
Figures 8, 9:
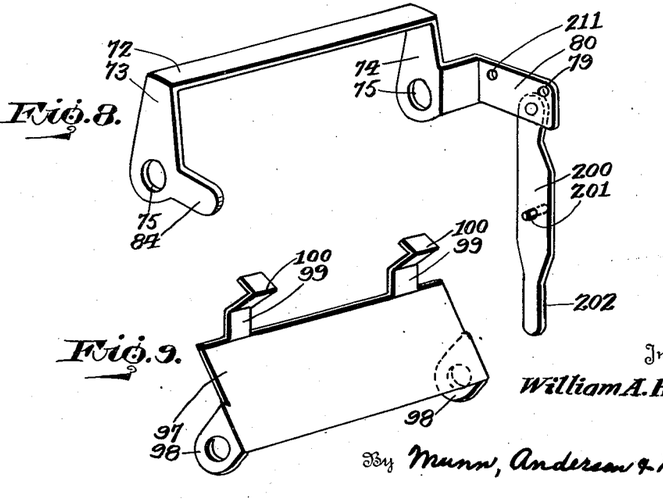
Figure 8 is a view in perspective of the dispensing element per se.
Figure 9 is a view in perspective of a device for holding the articles in position from discharge when the lowermost article is being dispensed.

A dispensing bar 72 (Figs. 6 and 7) has depending legs 73 and 74 which have openings 75 to receive a shaft 76 that is mounted in bearings formed in the bars 39 and 40 of the rectangularly shaped member 38. Depending levers 77 are located exteriorly of the outer casing 70 where the shafts 76 project therethrough. Each dispensing bar 72 normally is located in a closing relation with its opening 48 in the table 36 and is maintained in position by means of springs 78 located at the rear of the back plate 45 as shown in Figure 2. Each spring is connected at its lower end in an opening 79 formed in an angularly disposed finger 80 which projects outwardly from the legs 74 (Fig. 8). The upper end of each spring, as shown in Figure 2, is connected to a guide 82 of the pair of guides 81 and 82. These guide members each have flanges 83 which are secured to the rear face of the back plate 45.

Figure 5:
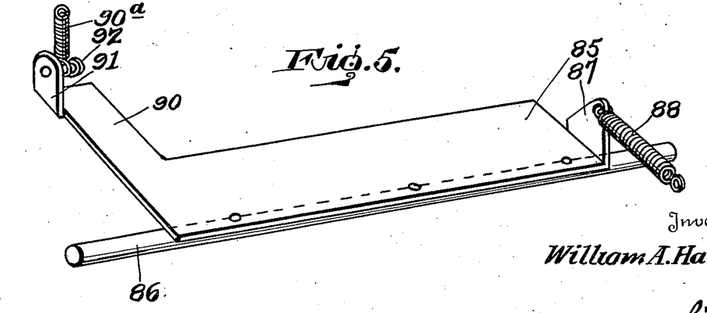
Figure 5 is a view in perspective of an actuating plate which controls mechanism for dispensing of one article or a number of articles in succession.

The front leg 73 depending from the bar 72 is provided with a finger 84 which is adapted to engage a depressible plate 85 (Fig. 5) which is secured to a shaft 86, and the ends of this shaft are mounted in bearings carried by the side bars 41 and 42 of the rectangular frame 38. One end of the plate 85 is provided with a lip 87 to which one end of a spring 88 is connected. The other end of the spring is connected to a bracket 89 which is secured to the side bar 42 (Fig. 4). Said plate 85 is also provided with a rear extension 90 which has a lip 91 provided with a bolt 92 to which one end of a spring 90a is connected, the other end of the spring being connected to a crank arm 94 which operates a shaft 95 of a counting mechanism 96 for indicating the number of cigarettes which are dispensed from the machine regardless of the brand of cigarette or article.

Figure 6:
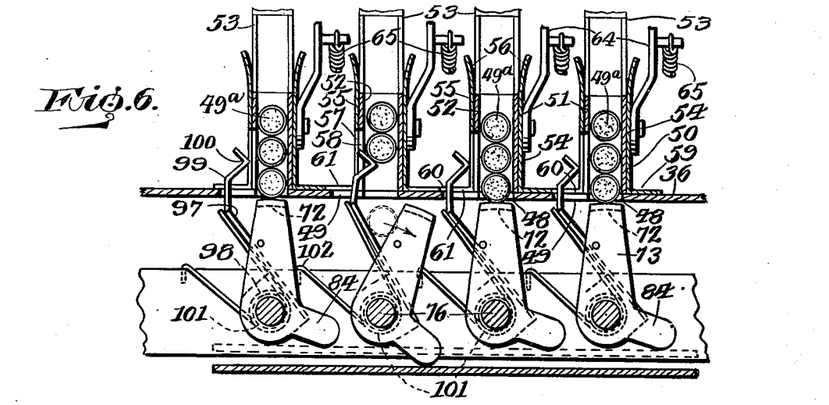
Figure 6 is a vertical section taken along the line 6—6 of Figure 4.

A plate 97 is provided with perforated lips 98 to receive a shaft 76. Each plate 97 is provided with detaining fingers designated by the numeral 99 (Fig. 9). Each finger has a V-shaped portion 100 which is adapted to be inserted between the lowermost pair of cigarettes for holding the cigarettes or articles within the magazine while the lowermost article is being dispensed. These fingers project through the alined openings 49 and 61 respectively, formed in the table 36, and the base members 60 of the vertically disposed plates 55 (Fig. 6). The V-shaped members 100 of these fingers are adapted to be projected through the alined openings 57 and 58 respectively, in the plates 55 and 56 when a cigarette or other article is being dispensed from the machine.

It will be noted from Figures 4 and 6 that a spring 101 is coiled about the shaft 76 and has one end 102 engaged over the rear bar 40, while the other end of the spring as shown at 103, is engaged over the top edge of the plate 97. Thus, it will be seen that when one of the levers 77 is rocked in the direction indicated by the arrow in Figure 1 the dispensing bar 72 will be moved away from its respective opening in the table 36, but the pair of V-shaped members 100 will be forced between a pair of the articles before the bar 72 has been completely removed from its respective opening whereby the remaining articles in the magazine will be held against discharge while one article is being discharged.

Figures 16, 17, 18, 21:
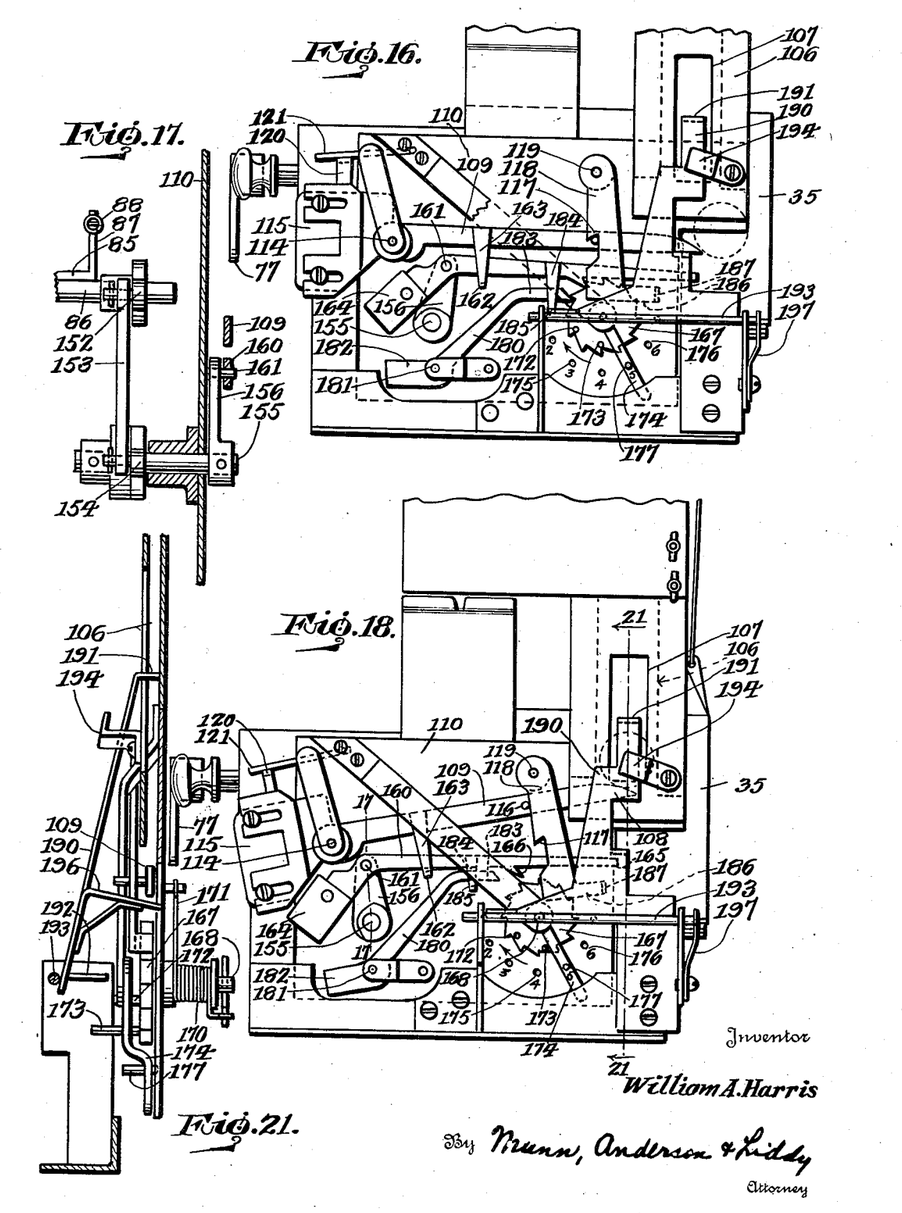
Figure 16 is a fragmentary side or end view of the dispensing apparatus showing the parts in operative position for consecutively dispensing the articles.
Figure 17 is a vertical section taken along the line 17—17 of Figure 13.
Figure 18 is an end view of the machine, similar to that shown in Figure 16, showing the parts in an inoperative position.
Figure 21 is a vertical section taken along the line 21—21 of Figure 18.

The machine is coin controlled so that when the operator of the machine places a coin of a certain denomination in the slot 104 (Fig. 20) it will pass down through channels formed in the fraud detecting unit 105 which forms no part of the present invention and be discharged into a chute 106 which has a sight opening 107 where it will engage the free end 108 of a lever 109 because of the fact that the free end of the lever as shown in Figure 18 projects into the bottom of the chute 106.

The chute 106 has a back plate 110 (Figs. 2 and 4) which is spaced outwardly from the side bar 42 of the frame 38 and is of sufficient dimensions to support other mechanism which will be presently described. This back plate is connected by means of brackets 111 and bolts 112 to the frame of the fraud detecting unit 105.

Referring more particularly to Figs. 1, 4, 7 and 16 to 18, inclusive, it will be seen that the lever 109 is pivotally mounted on an axle 114 carried by the back plate 110 and is provided with a weighted portion 115 which tends at all times to raise the free end 108 when a pin 116 has been released from a notch 117 of a latch 118 which is pivotally mounted at 119 on the plate 110.

A finger 120 is rigidly connected with the weighted portion 114 of the lever 109 and this finger engages a crank arm 121 which is connected with a release rod 122 (Fig. 4). The crank arm is pivoted at 123 in the side bar 42 of the frame 38. The release rod 122 is further provided with a crank arm 124 which has a bearing at 125 in the side bar 41. This crank arm is provided with an extension 126 which has a finger 127 engageable beneath a pivoted lever 128 (Fig. 19) which when depressed by means of the finger 129 connected to an arm 130 which in turn is connected with a lever 131, will cause the lever 128 to be moved to the lowermost dotted line position shown in Fig. 20. The lever 131 is connected to the rock shaft 86 which is oscillated when any one of the levers 77 are rocked.

The release rod 122 is located beneath a plurality of pins 135 which project laterally from each of the pawls 136. These pawls are pivoted at 137 (Fig. 7) on the front bar 39 of the frame 38 (Fig. 4). The free ends of the pawls rest upon discs 138 which are secured to the shafts 76 with the free ends of the pawls normally engaging notches 139 formed in said discs.

Each disc is provided with a second notch 140 and a plurality of teeth 141. The teeth are adapted to be engaged by a gravity actuated pawl 142, while the notch 140 is adapted to receive a finger 143. Associated with the finger 143 is a toe 144 which is adapted to strike the pawl 142 and move it out of engagement with the teeth 141 when the finger 143 engages a shoulder 145 of the notch 140. When the levers 77 are released and the shafts 76 are likewise, due to the action of one of the springs 78, the disc 138 is rotated in a direction which is reverse of the direction indicated by the arrow shown in Fig. 7, and the finger 143 will be engaged with the shoulder 146 of the notch 140 so that the finger will be rocked and the toe 144 will be moved away from the pawl 142 whereby the pawl 142 will fall by gravity into engagement with the teeth 141 of the disc 138.

It will be seen by this construction that the shafts 76 and likewise the levers 77 are prevented from being rocked until the pawls 136 are released from the notches 139 in the discs 138. The pawls 142 are pivoted at 150 on the front bar 39 of the frame 38 while the fingers 143 are pivoted at 151 on said bar. The pawls 142 prevent the operator from reversely rotating the shafts 76 and likewise the dispensing bars 72 in the opposite direction indicated by the arrow in Fig. 6 so that a cigarette or other article may not be jammed within one of the openings 48 and thus be injured.

Raising of the release bar 122, as has been stated, raises the pins 135 and likewise the pawls 136 to release all of the discs 138 and dispensing shafts 76 until the proper number of articles has been dispensed when the release rod will be lowered automatically and the pawls 136 will then engage their respective notches 139 and prevent further actuation of the machine for dispensing purposes as will be more particularly explained hereafter.

When the rock plate 85 is operated by any one of the members 84, it will rock the shaft 86 and likewise a lever 152 (Figs. 3 and 4), an oscillating link 153, a lever 154, and a shaft 155 which is connected to said lever. The shaft 155 has a bearing in the plate 110 and extends through said plate, and a lever 156 (Fig. 18) is connected to the shaft exteriorly of said plate. A reciprocating rod 160 is pivotally connected at 161 with the free end of the lever 156. This lever is lifted in conjunction with the lever 109 by means of a finger 162 which is carried by an arm 163 rigidly attached to the lever 109. The rod 160 is provided with a weight 164 which tends to raise the free end 165 of the rod 160. Said rod is provided with a pawl 166 which is adapted to engage a tooth of a ratchet wheel 167 which is secured to a shaft 168 and the shaft in turn is mounted in bearings carried by the plate 110.

A coil spring 170 (Fig. 21) has one end connected to the shaft 168, while the other end 171 is connected to a fixed part of the frame so that when the shaft 168, and likewise the ratchet wheel 167 are rotated in the direction indicated by the arrow in Figure 18, said coil spring will be wound up whereby when the ratchet wheel is released it will move back to its normal inoperative position.

The ratchet wheel is provided with a pin 172 projecting laterally from its face, and a second pin 173 which is longer than the pin 172 also projects laterally from the face. The long pin forms a double function in that when the ratchet wheel 167 is released and is returned to its normal position as shown in Figure 18 it will engage a stop arm 174 and retain the ratchet wheel against further reverse rotation.

The plate 110 is provided with a dial 175 which is supplied with numerals and indentations 176 to receive a projection 177 formed on the arm 174. This arm, as will be presently explained, is adapted to be lifted so that the projection 177 will drop into the depressions 176 for holding the arm in a predetermined position and for determining the number of articles to be dispensed from the machine when a coin of a predetermined denomination is placed within the machine. A retaining pawl 180 is pivotally mounted at 181 on the plate 110 and is provided with a weight 182 adapted to cause the free end 183 to be elevated when released by the teeth of the ratchet wheel 167. The free end 183 of the pawl 180 is received by a sling in the form of an arm 184 which has a laterally disposed finger 185 which is adapted to engage the free end 183 of the pawl 180 for raising the same when the rod 160 is elevated.

The member 118 (Figs. 16, 18) is provided with an angularly disposed arm 186 which has a laterally bent finger 187 located adjacent the outer end of the reciprocating rod 160 when the pin 116 is engaged beneath the shoulder 117 formed in the member 118. The weight of the rod 160 per se is slightly greater than the weight 164 so that the rod will tend to pull downwardly and place the pawl 166 into engagement with the tooth of the ratchet wheel 167. The member 164 acts as an aid when the lever 109 raises the rod 160.

A keeper to prevent a coin from dropping down and actuating the lever 109 before all of the required number of articles are dispensed from the machine consists of a lever 190 (Fig. 2) which has a finger 191 adapted to move through the window 107 (Figs. 16, 18) and engage the back part of the chute 106 so that when the coin drops into the chute it will fall downwardly and rest upon the finger 191 until the lever 190 is moved outwardly and the finger is moved from the window 107. This finger remains in this position until all of the articles are dispensed to which the operator is entitled. When the parts are released and the machine is closed for further operation and just before the ratchet wheel 167 is released for return to its normal inoperative position the long pin 173 will engage a lip 192 which is rigidly secured to a shaft 193 to which the lower end of the lever 190 is secured and elevated thereby rocking the lever 190 outwardly until it engages a stop 194 carried by the chute 106. The finger 191 is then moved outwardly as shown in Fig. 2 from the chute 106 so that if a coin is located within the chute and resting on the lip 191 it will be discharged downwardly so that it can engage the free end of the lever 109 and depress said lever.

An arm 196 (Fig. 16) projects laterally from the lever 190 and is in a position to be engaged by the free end 108 of arm 109 and rock the lever inwardly so that the finger 191 will move into the window 107 of the chute 106 and be in a position to retain a succeeding coin out of engagement with the lever 109 until all of the articles which should have been discharged are dispensed.

A spring 197 engages the free end of the shaft 193 for resisting rotation of the shaft so that the shaft and the lever 190 will retain its various positions when operated.

Referring more particularly to Figs. 2, 4, 10 and 11, it will be seen that the spring-actuated levers 80 have pivotally mounted thereon depending fingers 200 which hang freely therefrom and each finger is provided with a pin 201 rigidly secured to said finger. The pins extend upon opposite sides of the finger for engagement with the top plate 31 (Fig. 2) to limit the downward movement of the fingers. The fingers at the lower ends are reduced as shown at 202 and these fingers are adapted to be moved through openings 203 formed in the plates 29, 30 and 31, respectively. Located between the fingers 200 and between the plates 29 and 31 are a plurality of slidably mounted stops 204 which are adapted to be shifted back and forth when a finger is moved downwardly as shown more particularly in Figure 11. When one finger is moved downwardly the cam edges 205 of the finger will engage between the ends of a pair of the plates and shift all of the plates to one side to close the openings or passages 203 so that only one of the fingers can be moved downwardly at a time. Since the levers 80 (Fig. 8) are rigidly connected with the dispensing bars 72 it will be seen that when a finger 200 is projecting downwardly it will be possible to rock only one lever 77 because the plates or stops 200 will have been shifted across the openings 203 to prevent the rest of the fingers 200 from being lowered and prevent likewise the operation of the remaining levers.

An oscillating pawl 210 is located adjacent each counter casing 66 (Figs. 1 and 3) and at the rear of the plate 45. The upper end of each pawl is guided by the members 81 and 82 while the lower end is pivotally connected by means of a pin 207 mounted in a perforation 211 formed in the lever 80 (Figs. 2 and 8). The free ends 212 of the pawls 210 are shown in Figs. 3 and 13 and are adapted to engage teeth 213 of a wheel 214 which is provided with a circular dial 215 having numerals 216. A retaining pawl 217 is pivoted at 218 and a coil spring 219 is wrapped around the pivot of the pawl 217 and has one end 220 engaging over said pawl while the other end 221 engages over the outer edge of the pawl 210 so that these pawls will be flexibly retained in engagement with the teeth of the wheel 214.

As shown more particularly in Figure 1, each of the casings 66 is provided with a window 222 through which the numerals 216 are adapted to appear. Since the cartons in this case contain fifty cigarettes when the machine is filled the numeral 50 will appear and as the wheel 214 is rotated by the pawl 210 numerals from 50 to 1 will then appear until the magazine is empty when it will show 0 and further operation of the dial associated with the empty carton will be prevented as will be presently explained.

A series of bars (Figs. 2 and 3) as indicated by the numeral 230 are pivotally mounted at 231 at their upper ends between a pair of ears 232 secured in spaced relation to the back plate 45. A spring 233 coiled upon each pin 231 has a free end 234 engaging over each pivoted bar 230 tending to maintain said bar inwardly toward the back plate 45. The other ends of the springs engage said back plate. The lower end of each bar projects through a slot 235 formed in the rear end of the table 36 and the flange 46 and when so positioned it will be in the path of movement of the dispensing bar 72 so that said bar will engage the free end of the pivoted bar and prevent actuation of the lever 77 and actuation of the dispensing bar 72 unless a carton of cigarettes has been placed within the machine.

When a carton has been placed within the machine the laterally disposed member 67 on the back of the carton passes through the perforation 68 in the rear wall 45 and will contact the stop bar 230 and force said bar outwardly so that the free end of said bar will be moved out of the slot 235 in the table 36 and away from the path of movement of a dispensing bar 72.

A crank 236 is pivotally supported by the back 45 and has an operating arm 237 adapted to be manually manipulated whereby the crank may be forced outwardly from the plate 45 to engage all of the stop bars 230 and move them to an inoperative position and out of the path of the rockable dispensing bars 72. This crank may be utilized for moving the bar outwardly when inserting a carton or magazine of articles, or at any other time when it is desired to actuate the lever 77 for some particular purpose, and when a magazine has not been placed in operative relation with a particular lever or levers.

The mechanism described above is adapted to be set in operation by coins of higher denomination than a cent so that in the case of cigarettes, more than one cigarette will be delivered to the operator when he has deposited the proper coin in the slot 104. On the other hand, when a cent is deposited in the slot 240 (Fig. 20) the mechanism on the left hand side of the machine is set in operation to deliver one cigarette when one of the levers 77 is operated. However, when one of these levers is operated once the machine is stopped from further operation.

Figures 19, 20:
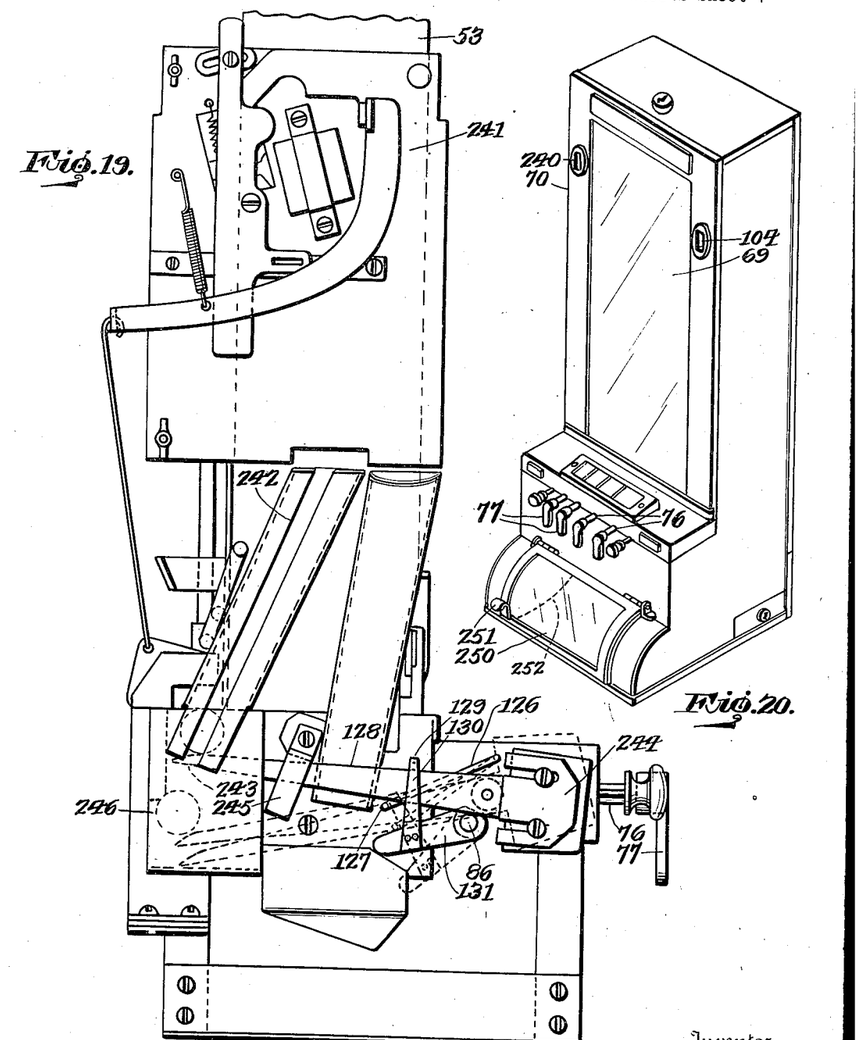
Figure 19 is an end view opposite to that shown in Figures 16 to 18, inclusive, with the parts in the position to be actuated for dispensing only one article.
Figure 20 is a view in perspective of the dispensing machine as shown assembled with the casing thereon.

Referring more particularly to Figure 19, it will be seen that a fraud detecting device 241 is secured to the upper portion of the back plate 45 so that when the cent has passed through the detecting device it will be deposited into a chute 242 and fall upon the free end 243 of the lever 128. When this happens the lever 128 will be lowered and as has been previously stated it will press downwardly upon the finger 127 of the releasing rod 122 and thereby elevate said releasing rod. When this rod is released it will raise the pins 135 (Fig. 7) and likewise the pawls 136 out of engagement with the notches in the discs 138 whereby any one of the levers 77 may be rocked to discharge one cigarette from a container or magazine.

Since there is no device at the left hand side of the machine for permitting more than one cigarette to be discharged, the lever 128 will be raised immediately upon the return of the lever 77 and further operation of the machine can only be had by depositing another cent. The lever 128 is provided with a weight 244 which will cause said lever to raise immediately after the cent has been discharged from the free end thereof. A guide 245 is provided adjacent the free end of the lever 128 for maintaining it in proper position so that it will move upwardly within the chute so that it can be engaged by the cent 246.

Referring more particularly to Figure 20, it will be seen that a door 250 is provided with a hand grip 251 so that the door may be raised to obtain the cigarettes or other articles which have been dropped and moved toward the front by means of a chute 252.

The operation of my device is as follows: The stop 174 (Figs. 16 and 18) is moved to the desired notch, and in this instance it is shown as being located at 5 so that when a nickel is dropped into the slot 104 it will fall downwardly and engage the free end 108 of the lever 109 (Fig. 18) which is shown in raised position and thereby depress said lever until the pin 116 on the lever will engage beneath the shoulder 117 on the swingable member 118. At this time the nickel will roll outwardly into the usual coin depository provided for the purpose. The device is now in position to be operated by one of the levers 77. If on the other hand, the customer desires to obtain a cigarette of five different brands he may operate each lever in succession until the five cigarettes have been dispensed.

When the lever 109 is lowered by the nickel the member 120 will be rocked under the free arm 121 of the releasing rod 122 and the crank arm 121 will be elevated as will be the releasing rod so that all of the pawls 136 will be raised out of engagement with the notches in the discs 138 and all of the levers 77 will be free for operation.

When a lever is rocked one of the dispensing bars 72 (Fig. 6) which is associated with said lever will be moved away from an opening 48 to release a cigarette while a finger 100 will engage the next uppermost cigarette and hold the cigarette from being dispensed.

The rocking of the lever 77 will cause the lever 152, the oscillating link 153 and the lever 154 (Fig. 3) to be actuated so that the lever 156 (Figs. 16 and 18) will likewise be rocked to move the bar 160 to the right whereupon the pawl 166 which is in engagement with a tooth of the ratchet wheel 167 will rotate the ratchet wheel one step. Since the pawl 160 is also in engagement with the teeth of the ratchet wheel it will prevent the reverse rotation of the ratchet wheel by the spring 170. The ratchet wheel, however, may be operated through five steps due to the fact that the pin 173 is in engagement with the stop 174 which is maintained at number 5 on the dial (Fig. 18).

When the pin 172 which is moving through an arc of a circle raises one edge of the pivoted member 118 it will kick said member to the right and release the pin 116 from the shoulder 117 whereby the lever 107 will be elevated. At the same time the finger 162 on the member 153 pulls up on the rod 160 and since the pawl 180 has a loose connection with the rod 160 it will also be raised whereby the ratchet wheel 167 will be released and the spring will return the ratchet wheel until the pin 173 again contacts the stop 174.

When the long pin 173 is rotated through an arc of a circle sufficiently to contact the lip 192 it will raise the lip and throw the lever 190 outwardly until it engages the stop 194. The lever 190 is moved outwardly to permit another coin to pass through the chute 106 and again engage the free end of the lever 109 for lowering it and placing the pin 106 again beneath the shoulder 117 of the gravity actuated member 118.

If, for some reason, the operator does not release all of the cigarettes which he is entitled to and someone else deposits a nickel in the slot 104, the finger 191 (Fig. 2) will still be located within the opening 107 and retain the nickel in an elevated position and out of contact with the free end of the lever 109 so that the new operator of the machine when he rocks the lever 77 will obtain the number of cigarettes which the former operator failed to get. However, the new operator can operate the lever not only the number of times which the former operator failed to do, but can operate the lever the number of times which he is entitled to and thus obtain a greater number of cigarettes. In other words, the machine will pay out at all times the number of cigarettes for the amount of money which has been deposited therein.

When the machine has dispensed the required number of cigarettes and the lever 109 has been released it will move upwardly whereby the finger 120 will be lowered permitting the crank arm 121 to be lowered which is connected with the release rod 122 so that the pawls 136 will be dropped into engagement with the notches 139 of the discs 138 and further operation of the machine will be prevented until another nickel or coin of the proper denomination is deposited in the machine.

Referring more particularly to Fig. 13 it will be seen that one tooth is omitted from the wheel 214, as shown at 260. This space is engaged by the free end 212 of the pawl 210 when the zero indication on the dial 215 is at the window 222 of the casing 66. At this time a lug 262 projecting inwardly from the casing 66 is engaged by a lug 263 on the wheel 214. The pawl may be reciprocated but will not engage a tooth and thus prevent further rotation of the wheel and the dial 215. When a fresh carton of cigarettes or a new magazine filled with some article is placed in the machine, the dials will have to be reset so that the free end 212 of the pawl 210 will be in engagement with the tooth indicated by the numeral 261 and the dial will again indicate the cigarettes which are being dispensed.

The dials are reset by the spring 300 which are placed under tension when the wheels 214 are rotated step-by-step by the operation of the pawls 210. The pawls 210 and 217 are manually released so that the springs which have been under tension by the rotation of the wheels will return the dials to their initial positions when the pawls have been released.

The pawl 217 is maintained in operative position by the spring arm 220 which places the pawl into engagement with the teeth 213.

The member 210 is oscillated each time a handle 77 is rocked because the lower end of each member 210 is pivotally connected at 207 with one of the rocking members 80 shown in Figs. 2 and 8. The oscillation of any of the members 210 will cause the pawl 212 at the outer free end of the member 210 to force the wheel 214 one step whereby the free end of the pawl 217 will ride over the oncoming tooth and will engage said tooth to maintain the wheel against rotation by the spring 300.

It is to be understood that while cigarettes are shown as being dispensed from the present machine, that variations in the size of the machine may be made to dispense cigars, or any other article, and the coin-controlled mechanism can be so constructed that it will operate only by the insertion of the coin of the proper denomination to obtain the article. In other words, if cigars are dispensed from the machine, a deposit of a nickel at the left hand side of the machine will dispense one cigar, while the deposit of a quarter in the slot 104 will permit the operator to obtain five cigars or three cigars as the case may be.

I claim:

1. A vending machine comprising a frame, a table carried by the frame and provided with an opening through which articles are to be dispensed, a closure for the opening for supporting a column of articles over the opening, means for rocking the closure to discharge articles, a locking means for the closure away from the opening, means for releasing the locking means, means pivotally mounted on the rocking means for the closure and adapted to be moved between the lowermost pair of articles, a spring for urging the pivoted means across the opening above the rocking means, and a stop for restraining the movement of the pivoted means when said means is in operative position between the lowermost pair of articles before the closure has entirely moved away from the opening.

2. A vending machine comprising a frame, a rockable means for supporting a column of articles, means for actuating the rockable means to discharge articles, means controlling the release of the articles one by one from the column, a locking means for the rockable means, means for releasing the locking means, means actuated by the rockable means for causing release of a predetermined number of articles from the column upon a single release of the locking means, and means rendering the locking means operative after a predetermined number of articles have been dispensed.

3. A vending machine comprising a frame, a table carried by the frame and provided with a plurality of openings through which articles are to be dispensed, a closure for each opening for supporting a column of articles, means for rocking each closure individually to discharge articles, a locking means for all of the rocking means, means for releasing the locking means for all of the rocking means simultaneously, a removable magazine associated with each opening in the table, an additional retaining means for each rocking means, and means on each magazine engageable with the last mentioned retaining means when said magazine is inserted into the vending machine for causing release of the retaining means.

4. A vending machine comprising a frame, a table carried by the frame and provided with an opening through which articles are to be dispensed, a closure for the opening supporting a column of articles, means for rocking the closure to discharge articles, a locking means for the closure, means for releasing the locking means, the table having a notch adjacent the opening, a swingable latch adjacent the notch and engaging said notch and the rocking means to prevent actuation of the rocking means, and a magazine insertible into the vending machine and provided with a lip for forcing the latch to an inoperative position to release the rocking means.

5. A vending machine comprising a frame, a table carried by the frame and provided with a plurality of openings through which articles are to be dispensed, a closure for each opening supporting a column of articles, means for rocking each closure individually to discharge articles, a locking means for the closures, means for releasing the locking means for all of the rocking means simultaneously, a removable magazine associated with each opening in the table, an additional retaining means for each rocking means, means on each magazine engageable with the adjacently disposed retaining means when said magazine is inserted into the vending machine for causing the release of the additional retaining means, and means for placing simultaneously all of the movable locking means in an inoperative position.

6. A vending machine comprising a frame, a table carried by the frame and provided with a plurality of openings through which articles are to be dispensed, a closure for each opening supporting a column of articles, means for rocking each closure individually to discharge articles, a locking means for the closures, means for releasing the locking means for all of the rocking means simultaneously, a removable magazine associated with each opening in the table, an additional retaining means for each rocking means, means on each magazine engageable with the adjacently disposed retaining means when said magazine is inserted into the vending machine for causing release of the additional retaining means, a crank in position to engage all of the retaining means, and means for operating the crank to release all of the retaining means simultaneously.

7. A vending machine comprising a magazine for housing a column of articles, a rockable means for supporting the column of articles, means for actuating the rockable means for discharging an article from the magazine, means for retaining the remainder of the articles in the column against release when the lowermost article is being discharged, a ratchet wheel, a spring tending to revolve the wheel in one direction, a reciprocating pawl adapted to rotate the wheel in the opposite direction step-by-step, means operated by the rockable means for causing reciprocation of the pawl and rotation of the wheel, a gravity-actuated locking means retaining the rocking means against movement, manually operated oscillating means for moving the locking means to an inoperative position, and means operated by the wheel for causing the oscillating means and locking means to return to normal position.

8. A vending machine comprising a magazine housing a column of articles, a rockable means supporting the column of articles, means for actuating the rockable means for discharging an article from the magazine, means retaining the remainder of the articles in the column against release when the lowermost article is being discharged, a rotatable wheel, a spring tending to revolve the wheel in one direction, a reciprocating pawl adapted to rotate the wheel in the opposite direction step-by-step, means operated by the rockable means for causing reciprocation of the pawl and rotation of the wheel, a locking means holding the rockable means against movement, means for releasing the locking means and retaining the locking means in an inoperative position, means for retaining the releasing means against movement when the locking means is in an inoperative position, and means actuated by the rotated wheel for releasing the retaining means after a number of articles is discharged from the magazine.

9. A vending machine comprising a magazine for housing a column of articles, rockable means supporting the column of articles, means for actuating the rockable means for discharging an article from the magazine, means for retaining the remainder of the articles in the column against release when the lowermost article is being discharged, a rotatable wheel, a spring tending to revolve the wheel in one direction, a reciprocating pawl adapted to rotate the wheel in the opposite direction step-by-step, means operated by the rockable means for causing reciprocation of the pawl and rotation of the wheel, a locking means holding the rockable means against movement, means for releasing the locking means and retaining the locking means in an inoperative position, means for retaining the releasing means against movement when the locking means is in an inoperative position, means actuated by the rotated wheel for releasing the retaining means after a number of articles is discharged from the magazine, and an adjustable stop limiting the angle of reverse rotation of the wheel by the spring for determining the number of articles to be dispensed from the machine.

10. A vending machine comprising a frame, a table carried by the frame and provided with an opening, a closure for supporting a column of articles over the opening, means rocking the closure for discharging articles, a locking means for the closure, means for releasing the locking means, a finger pivotally mounted on the rocking means for the closure and adapted to be moved across the opening when the rocking means is moved, a spring on the rocking means tending to move the finger across the opening, a stop engageable with the finger and restraining the finger from further movement after it has been placed in an operative position over the opening and after the closure has moved from the opening, said finger adapted to retain the column of articles against release when the lowermost article is being dispensed.

WILLIAM A. HARRIS.